(12) United States Patent
Liu et al.

(10) Patent No.: US 11,403,743 B2
(45) Date of Patent: Aug. 2, 2022

(54) CABLE DETECTION APPARATUS

(71) Applicants: Tyco Electronics (Shanghai) Co. Ltd., Shanghai (CN); TE Connectivity Corporation, Berwyn, PA (US); Kunshan League Automechanism Co., Ltd., Kunshan (CN)

(72) Inventors: Hongtao Liu, Shanghai (CN); Dandan Zhang, Shanghai (CN); Roberto Francisco-Yi Lu, Bellevue, WA (US); An Yang, Shanghai (CN); Lvhai Hu, Shanghai (CN); Yuting He, Kunshan (CN)

(73) Assignees: Tyco Electronics (Shanghai) Co. Ltd., Shanghai (CN); TE Connectivity Corporation, Berwyn, PA (US); Kunshan League Automechanism Co.. Ltd., Kunshan (CN)

( * ) Notice: Subject to any disclaimer, the term of this patent is extended or adjusted under 35 U.S.C. 154(b) by 286 days.

(21) Appl. No.: 16/698,408

(22) Filed: Nov. 27, 2019

(65) Prior Publication Data
US 2020/0172381 A1    Jun. 4, 2020

(30) Foreign Application Priority Data

Nov. 30, 2018    (CN) .......................... 201811462514.3

(51) Int. Cl.
*G06T 7/00*        (2017.01)
*G01N 21/88*       (2006.01)

(52) U.S. Cl.
CPC ....... *G06T 7/0002* (2013.01); *G01N 21/8806* (2013.01)

(58) Field of Classification Search
CPC .......... G01N 21/8806; G01N 21/8914; G01N 21/8851; G01N 2021/8918; G01N 2021/8887; G01N 21/55; G01N 25/72; G01N 2021/556; G01N 21/00; G01N 21/95; G01N 21/896; G01N 21/88; G01N 21/892; G01N 21/9508; G01N 2021/888; G01N 2021/8908; G01N 2033/009; G01N 21/3563; G01N 21/71; G01N 21/8422;
(Continued)

(56) References Cited

U.S. PATENT DOCUMENTS 4,979,389 A  * 12/1990  LaGrotta ................ G01N 19/08
                                                        73/37.7
6,512,536 B1 *  1/2003  Ross .................... G01B 11/105
                                                        348/61
(Continued)

FOREIGN PATENT DOCUMENTS

CN          106706665 A  *  5/2017
CN          108735396 A  *  11/2018    ......... H01B 13/2686
(Continued)

*Primary Examiner* — Michael P Stafira
(74) *Attorney, Agent, or Firm* — Barley Snyder

(57) ABSTRACT

A cable detection apparatus includes a cable support and a vision system. The vision system has a camera device rotatable about an axis parallel to an axial direction of a cable to be detected, so as to capture an image of the cable, and an optical element rotated synchronously with the camera device. The optical element transmits the image of the cable to the camera device by changing an optical path of the image.

20 Claims, 3 Drawing Sheets

(58) Field of Classification Search
CPC ........... G01N 21/8901; G01N 21/8903; G01N 21/894; G01N 21/9501; G01N 2021/751; G01N 2021/8433; G01N 2021/8854; G01N 2021/8917; G01N 21/01; G01N 21/359; G01N 21/75; G01N 21/956; G01N 21/95607; G01N 21/958; G01N 31/005; G01N 33/38; G01N 33/487; G01N 33/48721; G01N 35/00; G01N 17/00; G01N 19/08; G01N 2021/0112; G01N 2021/8444; G01N 2021/8858; G01N 2021/8877; G01N 2021/95615; G01N 21/13; G01N 21/89; G01N 21/90; G01N 21/909; G01N 21/952; G01N 21/95684; G01N 2201/0635; G01N 25/00; G01N 21/954; G01N 21/8803; G01N 29/043; G01N 2021/9542; G01N 2291/2693; G01N 2291/2694; G01N 2223/631; G01N 2223/646; G01N 23/02; G01N 27/90; G01N 29/4472; G01N 2021/7709; G01N 2021/7776; G01N 21/554; G01N 21/648; G01N 21/658; G01N 21/7703; G01N 2201/06113; G01N 2201/0612; G01N 2201/0633; G01N 2201/068; G01N 2291/0289; G01N 29/022; G01N 29/2418; G01N 2021/1787; G01N 21/21; G01N 21/4795; G01N 21/72; G01N 21/766; G01N 2201/02; G01N 2201/0833; G01N 23/083; G01N 23/185; G01N 3/56; G01N 1/36; G01N 2021/8835; G01N 2021/8867; G01N 2021/8874; G01N 2021/9544; G01N 21/84; G01N 21/8915; G01N 2203/0647; G01N 2291/044; G01N 23/20; G01N 29/4409; G01N 29/4445; G01N 1/2226; G01N 1/24; G01N 1/28; G01N 11/14; G01N 11/162; G01N 2021/8861; G01N 2021/887; G01N 2021/8909; G01N 2021/8924; G01N 2021/9518; G01N 2021/9548; G01N 21/25; G01N 21/91; G01N 21/9515; G01N 2201/103; G01N 2203/0005; G01N 2203/0017; G01N 2203/0019; G01N 2203/0044; G01N 2203/0048; G01N 2203/0094; G01N 2203/0641; G01N 2291/023; G01N 2291/0232; G01N 2291/2626; G01N 25/22; G01N 29/06; G01N 29/07; G01N 29/265; G01N 29/44; G01N 3/10; G01N 3/12; G01N 33/18; G01N 33/365; G01N 33/483; G01N 33/49; G01N 33/4905; G01N 33/86; G01N 5/04; G06T 2207/30124; G06T 7/0004; G06T 2207/10152; G06T 7/62; G06T 2207/10024; G06T 2207/30168; G06T 7/001; G06T 7/13; G06T 7/70; G06T 7/90; H02G 1/02; H02G 1/00; H02G 1/16; H02G 15/28; H02G 9/025; H02G 1/06; H02G 1/1292; H02G 3/0406; H02G 3/30; H02G 3/36; H02G 9/06; H02G 9/08; H01B 7/182; H01B 11/02; H01B 11/1878; H01B 11/22; H01B 11/04; H01B 11/1895; H01B 11/00; H01B 13/34; H01B 7/041; H01B 13/26; H01B 13/2686; H01B 13/2693; H01B 13/0036; H01B 13/0207; H01B 13/0257; F16L 2101/30; F16L 13/02; F16L 55/32; F16L 2101/12; F16L 55/26; F16L 55/28; F16L 55/46; F16L 55/40; F16L 55/48; F16L 2101/50; F16L 55/30; F16L 9/02
See application file for complete search history.

(56) References Cited

U.S. PATENT DOCUMENTS

2015/0062328 A1* 3/2015 Lauffer .................. G06T 7/0004
348/125
2018/0164673 A1* 6/2018 Speed ..................... F16L 55/26

FOREIGN PATENT DOCUMENTS

| JP | H08168156 A | * | 6/1996 | |
| KR | 20150103393 A | * | 9/2015 | |
| KR | 20150107355 A | * | 9/2015 | |
| WO | WO-2016072381 A | * | 5/2016 | ............. G01B 11/08 |
| WO | WO-2018201238 A1 | * | 11/2018 | ............. G01B 11/10 |

* cited by examiner

CABLE DETECTION APPARATUS

CROSS-REFERENCE TO RELATED APPLICATION

This application claims the benefit of the filing date under 35 U.S.C. § 119(a)-(d) of Chinese Patent Application No. 201811462514.3, filed on Nov. 30, 2018.

FIELD OF THE INVENTION

The present invention relates to a cable detection apparatus and, more particularly, to a cable detection apparatus adapted to detect whether there is a defect on a surface of a cable.

BACKGROUND

It is often necessary to ensure that there is no defect on a surface of a cable before assembling the cable with a terminal. A defect such as a scattered braid or foil, uncovered copper core, etc., often appears during cable handling. These defects may randomly appear on the outer surface of the cable, and thus the outer surface of the cable needs to be analyzed to ensure that there is no defect thereon.

The cable is usually placed on a rotating platform, and the cable on the rotating platform is then detected by a fixed camera device. This method, however, is only suitable for off-line detection of the cable with a short length, and it is difficult to implement on-line detection for the cable with a long length. Further, if the camera device is rotated, a larger space is required, and the space of the conventional cable feeding system is limited, thus making it very difficult to rotate the camera device in the conventional cable feeding system.

SUMMARY

A cable detection apparatus includes a cable support and a vision system. The vision system has a camera device rotatable about an axis parallel to an axial direction of a cable to be detected, so as to capture an image of the cable, and an optical element rotated synchronously with the camera device. The optical element transmits the image of the cable to the camera device by changing an optical path of the image.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
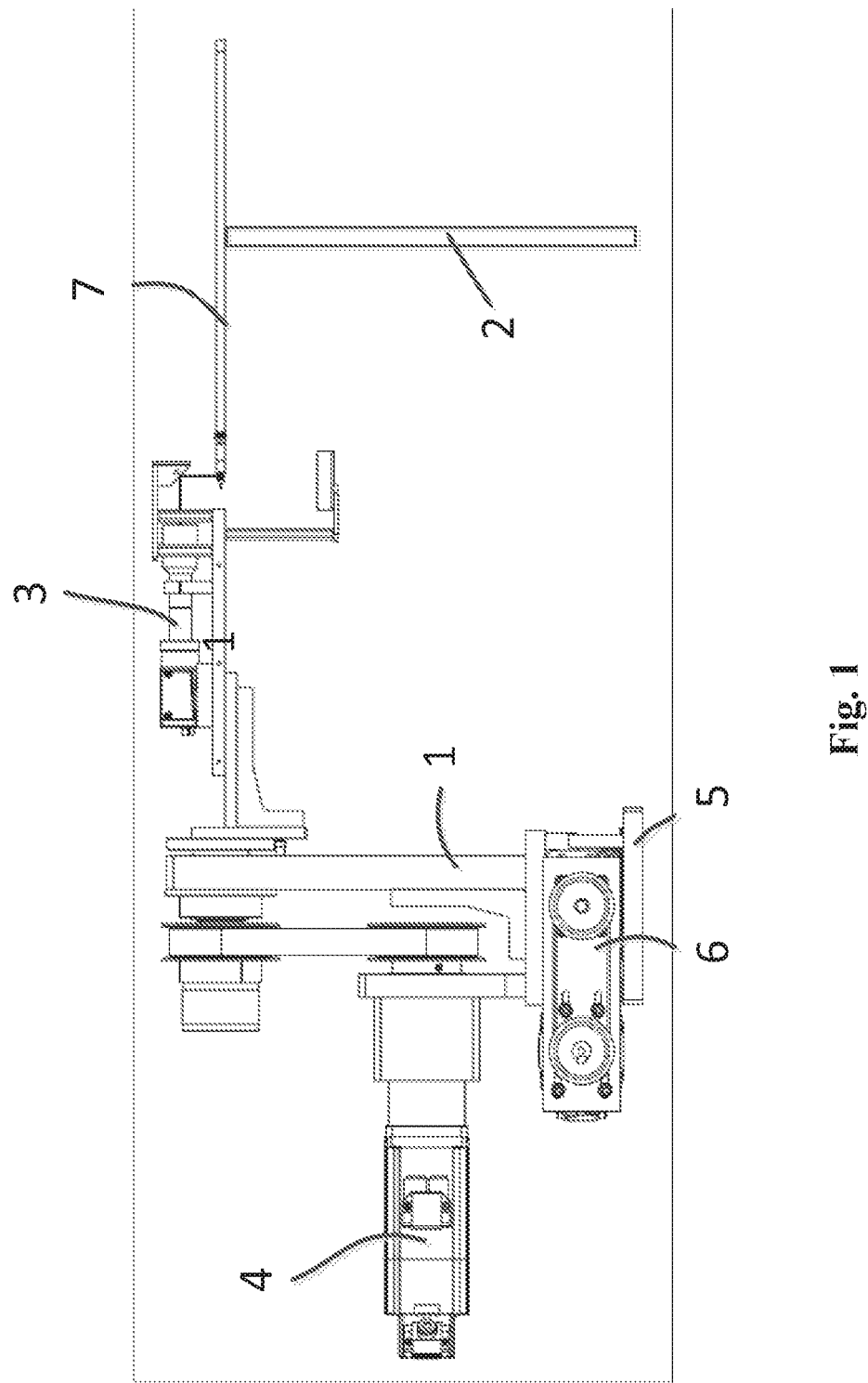
FIG. 1 is a side view of a cable detection apparatus according to an embodiment.

Technical solutions of the present disclosure will be further described in detail in combination with exemplary embodiments with reference to the attached drawings. In the description, the same or like reference numbers refer to the same or like elements. The following description of exemplary embodiments of the present disclosure made with reference to the attached drawings is intended to illustrate the general inventive concepts of the present disclosure, and should not be interpreted as limiting the present disclosure.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
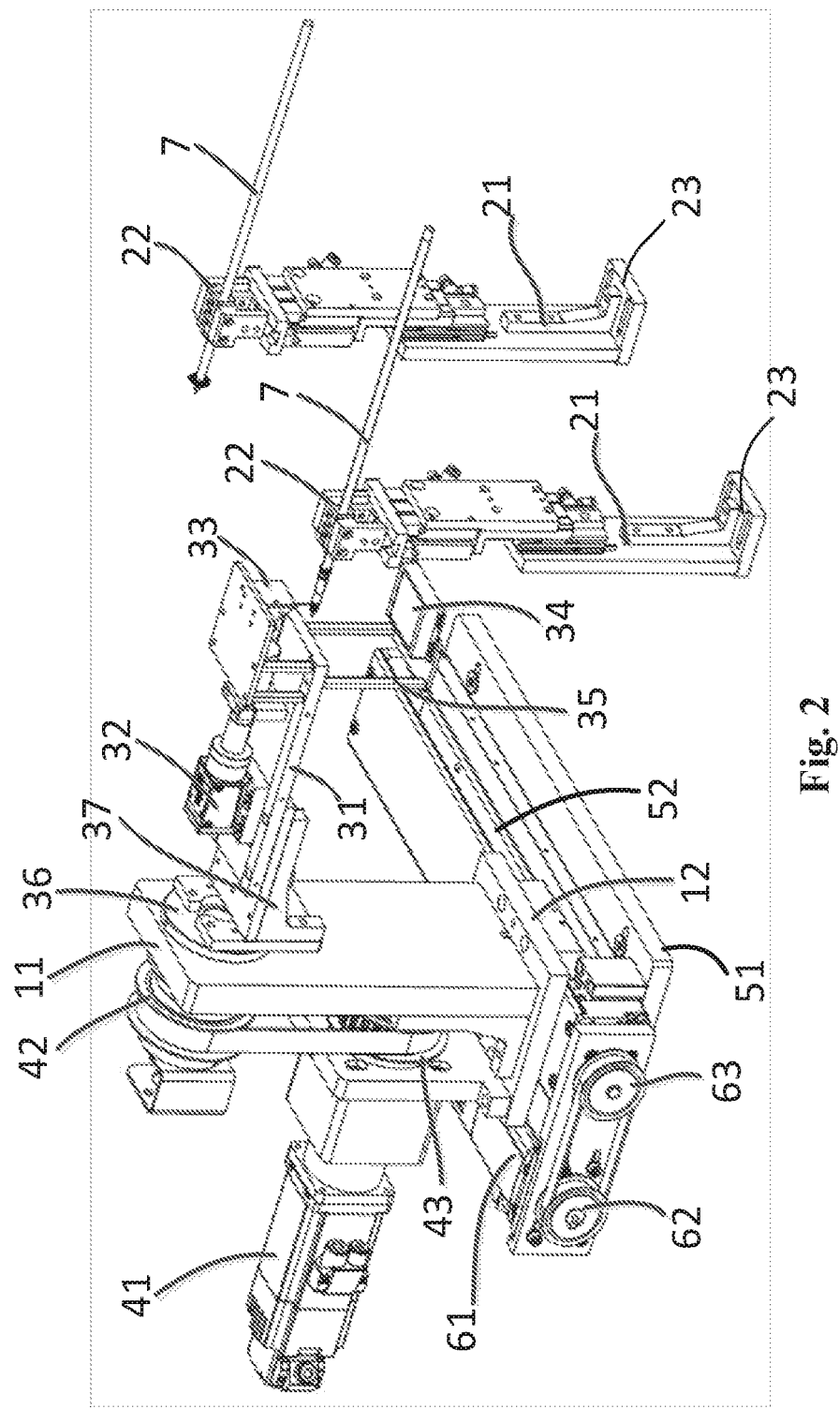
FIG. 2 is a perspective view of the cable detection apparatus.

A cable detection apparatus according to an embodiment, as shown in FIGS. 1 and 2, comprises a cable support 2 and a vision system 3. The cable support 2 is adapted to support a cable 7 to be detected, for example, in a radial direction of the cable 7.

Figure 3:
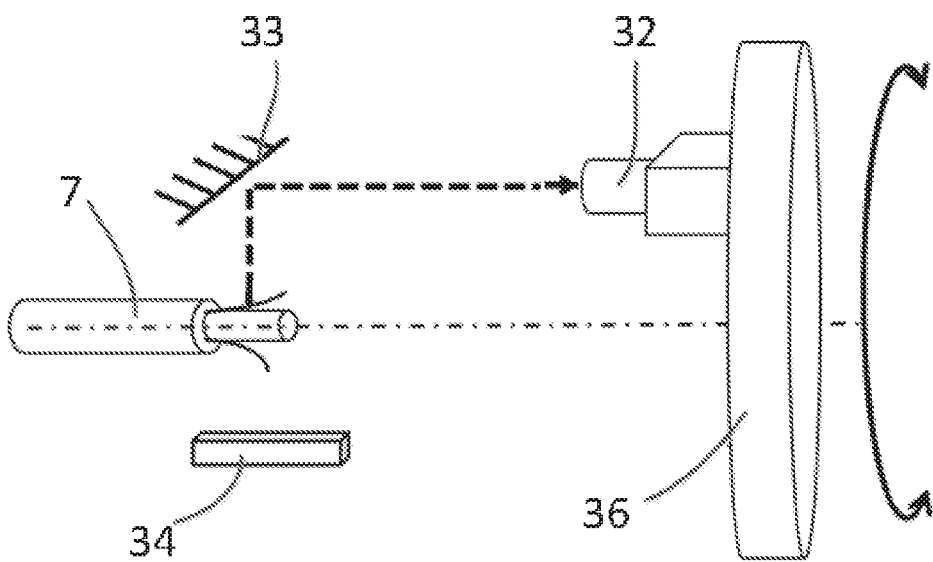
FIG. 3 is a schematic diagram of a vision system of the cable detection apparatus.

The vision system 3, as shown in FIGS. 2 and 3, includes a camera device 32 which is rotatable about an axis parallel to an axial direction of the cable 7 to capture an image of the cable 7. The vision system 3 includes an optical element 33 configured to be rotated synchronously with the camera device 32, to receive the image of the cable 7 and to transmit the image to the camera device 32 by changing an optical path of the image through reflection. In other embodiments, the optical element 33 may also change the optical path through refraction to transmit the image of the cable 7 to the camera device 32. The vision system 3 includes a backlight plate 34 configured to be rotated synchronously with the camera device 32. The backlight plate 34 and the optical element 32 are located on opposite sides of the cable 7.

The cable detection apparatus, as shown in FIGS. 1 and 2, comprises a mounting frame 1 and the vision system 3 includes a substrate 31. The camera device 32 is mounted on the substrate 31, for example, via a camera base, and the optical element 33 is mounted on the substrate 31, for example, via an optical element base which spans over the substrate 31 and protrudes from an end of the substrate 31 away from the mounting frame 1. The backlight plate 34 is connected to the substrate 31 by two vertical connection members 35. The substrate 31 is rotatably connected to the mounting frame 1 to drive the camera device 32, the optical element 33, and the backlight plate 34 to synchronously rotate about the axis parallel to the axial direction of the detected cable 7.

The cable detection apparatus, as shown in FIGS. 1 and 2, comprises a first driving device 4 configured to drive the vision system 3 to rotate about the axis parallel to the axial direction of the cable 7. The first driving device 4 may be configured to continuously or intermittently drive the vision system 3 to rotate about the axis parallel to the axial direction of the detected cable 7, depending on the application.

The first driving device 4, as shown in FIGS. 1 and 2, comprises a transmission mechanism and a first servo motor 41. The transmission mechanism is mounted on the mounting frame 1 and comprises a first driven wheel 42 connected to the substrate 31 and a first driving wheel 43 adapted to drive the first driven wheel 42. The first servo motor 41 is configured to drive the first driving wheel 43 to rotate so as to drive the substrate 31 to rotate via the first driven wheel 42, thereby driving the vision system 3 to rotate.

In an embodiment shown in FIG. 2, the vision system 3 comprises a rotatable connection member 36 by which the substrate 31 is connected to the first driven wheel 42. This facilitates the connection of the substrate 31 to the first driven wheel 42.

The vision system 3, as shown in FIG. 2, comprises an L-shaped support 37. The L-shaped support 37 has a horizontal portion connected to a side of the substrate 31 opposite to the side on which the camera device 32 is mounted, and a vertical portion connected to the rotatable connection member 36, thereby ensuring reliable connection between the substrate 31 and the rotatable connection member 36.

The cable detection apparatus, as shown in FIGS. 1 and 2, comprises a linear moving platform 5 on which the mounting frame 1 is reciprocally movable in a direction (i.e., a horizontal direction) perpendicular to the axial direction of the detected cable 7. The mounting frame 1 includes a vertical portion 11 and a horizontal portion 12 connected to the vertical portion 11. The linear moving platform 5 has a base 51 and a guide rail 52 located on the base 51, and the horizontal portion 12 of the mounting frame 1 is connected to the guide rail 52 of the linear moving platform 5 in a sliding way. The cable detection apparatus comprises a second drive device 6 configured to drive the mounting frame 1 to move on the linear moving platform 5. In this way, the mounting frame 1 can be driven by the second driving device 6 to move on the linear moving platform 5 so as to adjust a position of the camera device 32, so that the image of the cable 7 is located in the middle of the whole captured image.

The second driving device 6, as shown in FIGS. 1 and 2, has a second driven wheel 63 rotatably connected to the linear moving platform 5, a second driving wheel 62 adapted to drive the second driven wheel 63, and a second servomotor 61 configured to drive the second driving wheel 62 to rotate, so that the mounting frame 1 is driven to move reciprocally on the linear moving platform 5 by the second driven wheel 63 and, in an embodiment, by a ballscrew connected to the second driven wheel 63. However, in other embodiments, the second driving device 6 may also be a linear actuator or the like, for example.

As shown in FIG. 2, a plurality of cable supports 2 are spaced apart, for example, equally spaced apart, along a direction parallel to a moving direction of the mounting frame 1. Because the mounting frame 1 is reciprocally movable on the linear moving platform 5 in the direction perpendicular to the axial direction of the cable 7, the cables 7 on the plurality of cable supports 2 may be detected by one vision system 3, thereby further improving the working efficiency.

As shown in FIGS. 1-3, because both sides of the detected cable 7 may be seen in one image captured by the camera device 32, the vision system 3 may complete the detection of the entire circumferential surface of the detected cable 7 only by rotating within a range of 0° to 180°, thereby improving the working efficiency. In other embodiments, the vision system 3 may also be rotated within other ranges, for example, a range from 0° to 200° or a range from 0° to 360°.

As shown in FIGS. 1-3, the optical element 33 is a right-angle prism (i.e., a reflection angle is 90°), which may change the optical path by 90° reflection to transmit the image of the cable 7 to the camera device 32. In other embodiments, the optical element 32 may be a device having other reflection or refraction angle, such as 45° or 60°. The camera device 32 includes a camera and a microscope lens mounted on the camera to improve the imaging effects.

As shown in FIG. 2, the cable support 2 includes a support body 21 and a gripper 22 provided at a top end of the support body 21. The gripper 22 is adapted to grip the cable 7 to ensure that the cable 7 is reliably fixed during the detection process. In an embodiment, the gripper 22 is a pneumatic gripper so as to achieve automatic gripping of the cable 7, thereby improving the work efficiency. A fixing portion 23, which is adapted to fix the cable support 2, is provided at a lower end of the cable support 2. The cable support 2 may be fixed on the worktable by the fixing portion 23.

In an embodiment, a height of the support body 21 is adjustable, so that the height of the cable 7 can be adjusted according to a focal length of the camera device 32, thereby making the captured image clearer.

The cable detection apparatus, as shown in FIG. 1, comprises a data processing system configured to process the image captured by the vision system 3 to determine whether there is a defect on the cable 7. The cable detection apparatus comprises an alarm system coupled to the data processing system and configured to give an alarm when it is determined that there is a defect on the cable 7.

The cable detection apparatus according to the above embodiments realize the detection of the cable 7, especially the on-line detection of the long cable 7, by providing an optical element 33 configured to be rotated synchronously with the camera device 32, receive the image of the cable 7 and to change an optical path through reflection or refraction so as to transmit the image to the camera device 32. The cable detection apparatus may be installed in a limited space in the cable feeding system because a space required for rotating the camera device 32 and the optical element 33 is small, and the cable detection apparatus may be easily integrated with different types of the cable feeding systems.

It will be understood by those skilled in the art that the above-described embodiments are exemplary and that modifications may be made by those skilled in the art, and that structures described in the various embodiments may be freely combined without conflict in structure or principle. Although the embodiments of the present disclosure have been described in detail, it will be apparent to those skilled in the art that various changes and modifications can be made without departing from the scope and spirit of the appended claims, and the disclosure is not limited to the exemplary embodiments illustrated in the specification.

What is claimed is:

1. A cable detection apparatus, comprising:
   a cable support including a support body and a gripper disposed at an end of the support body and adapted to grip a cable to be detected; and
   a vision system including a camera device rotatable about an axis parallel to an axial direction of the cable to be detected, so as to capture an image of the cable, and an optical element rotated synchronously with the camera device, the optical element transmits the image of the cable to the camera device by changing an optical path of the image.

2. The cable detection apparatus of claim 1, wherein the optical element changes the optical path through reflection or refraction.

3. A cable detection apparatus, comprising:
   a cable support; and
   a vision system including:
      a camera device rotatable about an axis parallel to an axial direction of a cable to be detected so as to capture an image of the cable;
      an optical element rotated synchronously with the camera device, the optical element transmits the image of the cable to the camera device by changing an optical path of the image through reflection or refraction; and a backlight plate rotated synchronously with the camera device, the backlight plate and the optical element are located on opposite sides of the cable.

4. The cable detection apparatus of claim 3, wherein the vision system includes a substrate on which the camera device, the optical element, and the backlight plate are mounted.

5. The cable detection apparatus of claim 4, further comprising a mounting frame, the substrate is rotatably connected to the mounting frame so as to drive the camera device, the optical element, and the backlight plate to synchronously rotate about the axis parallel to the axial direction.

6. The cable detection apparatus of claim 5, further comprising a first driving device configured to drive the substrate to rotate about the axis parallel to the axial direction.

7. The cable detection apparatus of claim 6, wherein the first driving device includes a transmission mechanism mounted on the mounting frame, the transmission mechanism has a first driven wheel connected to the substrate and a first driving wheel adapted to drive the first driven wheel, and a first servo motor configured to drive the first driving wheel to rotate.

8. The cable detection apparatus of claim 7, wherein the vision system includes a rotatable connection member connecting the substrate to the first driven wheel.

9. The cable detection apparatus of claim 8, wherein the vision system includes an L-shaped support, the L-shaped support having a horizontal portion connected to a side of the substrate opposite the camera device and a vertical portion connected to the rotatable connection member.

10. The cable detection apparatus of claim 5, further comprising a linear moving platform on which the mounting frame is reciprocally movable in a direction perpendicular to the axial direction of the cable, and a second driving device configured to drive the mounting frame to move on the linear moving platform.

11. The cable detection apparatus of claim 10, wherein a plurality of cable supports are distributed at intervals along a direction parallel to a moving direction of the mounting frame.

12. The cable detection apparatus of claim 1, wherein the vision system is rotatable within a range of 0° to 180°.

13. The cable detection apparatus of claim 1, wherein the optical element is a right-angle prism.

14. The cable detection apparatus of claim 1, wherein the camera device includes a camera and a microscope lens mounted on the camera.

15. The cable detection apparatus of claim 1, wherein the gripper is a pneumatic gripper.

16. The cable detection apparatus of claim 1, wherein a fixing portion is disposed at a lower end of the cable support and fixes the cable support.

17. The cable detection apparatus of claim 1, wherein a height of the support body is adjustable.

18. The cable detection apparatus of claim 1, further comprising a data processing system configured to process the image captured by the vision system to determine whether there is a defect on the cable.

19. A cable detection apparatus, comprising:
   a cable support; and
   a vision system including:
      a camera device rotatable about an axis parallel to an axial direction of a cable to be detected; and
      an optical element rotated synchronously with the camera device, the optical element changing an optical path of an image of the cable to be detected such that the camera indirectly captures the image of the cable transmitted by the optical element.

20. The cable detection apparatus of claim 19, wherein a sensing axis of the camera is aligned generally parallel with the axial direction of the cable to be detected.

* * * * *